United States Patent Office 3,660,433
Patented May 2, 1972

---

3,660,433
PRODUCTION OF LACTONES
Jean Margaret Mallan and Edward Leo Kay, Akron, Ohio, assignors to The Firestone Tire & Rubber Company, Akron, Ohio
No Drawing. Continuation-in-part of abandoned application Ser. No. 866,726, Oct. 15, 1969. This application Sept. 18, 1970, Ser. No. 73,611
Int. Cl. C07d 5/06, 7/06
U.S. Cl. 260—343
10 Claims

ABSTRACT OF THE DISCLOSURE

Cyclic ketones are reacted with hydrocarbon hydroperoxides to produce lactones (corresponding to the ketones) and alcohols (corresponding to the hydroperoxides). Friedel-Crafts catalysts improve selectivities to the desired products. The lactones may be further reacted to produce lactams, and the alcohols may be dehydrated to olefins.

CROSS-REFERENCE TO RELATED APPLICATION

This application is a continution-in-part of our copending application Ser. No. 866,726, filed Oct. 15, 1969, now abandoned, entitled "Production of Lactones."

BACKGROUND OF THE INVENTION

This invention relates to a process for the production of lactones. Specifically, it relates to the production of lactones by the oxidation of cyclic ketones with organic hydroperoxides.

The oxidation of cyclic ketones with peracids to give lactones is well known in the art. Some of the peracids employed as peracetic acid, persulfuric acid, perbenzoic acid, and peroxytrifluoroacetic acid. In these reactions, the peracid is itself reduced and the corresponding acid appears as a reaction product.

Reference is also found in the literature to studies of the interaction of cyclic ketones with organic hydroperoxides in which a variety of reaction products are formed. One of such studies may be found in the book, Liquid Phase Oxidation of Hydrocarbons, Emanuel et al., Plenum Press, New York (1967), at pp. 84–86. The reaction as described in principally one of the decomposition of the hydroperoxide and its addition to the carbonyl group of the ketone. No catalyst was apparently employed, and the process is impractical for producing lactones.

SUMMARY OF THE INVENTION

It is an object of this invention to provide a process for the production of lactones by reacting cyclic ketones with organic hydroperoxides to give relatively high yields of lactones. It is another object of the invention to employ secondary or tertiary hydrocarbon hydroperoxides in the oxidation of cyclic ketones to lactones so as to obtain the corresponding secondary or tertiary alcohols as products of the reaction. These and other objects are accomplished by reaction of cyclic ketones with secondary or tertiary hydrocarbon hydroperoxides in the presence of a Friedels-Crafts catalyst at temperatures of from 0° to 100° C. to produce the corresponding cyclic lactones and the corresponding secondary or tertiary alcohols.

Cyclic ketones which are recommended as starting materials have the general empirical formula $C_nH_{2n-2}O$, where $n$ is an integer from 4 to 12 inclusive. Cyclobutanone, cyclopentanone, cyclohexanone, cycloheptanone, cyclooctanone, etc. are examples of typical cyclic ketones which may be used.

The secondary or tertiary hydrocarbon hydroperoxides used in the invention can be acyclic hydrocarbon hydroperoxides of from 3 to 10 carbon atoms, such as propane-2-hydroperoxide
butane-2-hydroperoxide
2-methylpropane-2-hydroperoxide
2-methylbutane-2-hydroperoxide
2-methylbutane-3-hydroperoxide
pentane-2-hydroperoxide
pentane-3-hydroperoxide
2-methylpentane-2-hydroperoxide
2-methylpentane-3-hydroperoxide
2-methylpentane-4-hydroperoxide
3-methylpentane-2-hydroperoxide
3-methylpentane-3-hydroperoxide
hexane-2-hydroperoxide
hexane-3-hydroperoxide
2,2-dimethylbutane-3-hydroperoxide
2,3-dimethylbutane-2-hydroperoxide
2,2,3-trimethylbutane-3-hydroperoxide
3-ethylpentane-3-hydroperoxide
1-butene-3-hydroperoxide
2-methyl-3-butene-2-hydroperoxide
2-methyl-1-butene-3-hydroperoxide
2-methyl-2-butene-3-hydroperoxide
2,3-dimethyl-3-butene-2-hydroperoxide
3-ethyl-3-butene-2-hydroperoxide etc.

Aromatic hydroperoxides represented by the general formula

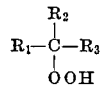

can also be used, where $R_1$ is phenyl or alkylphenyl, the alkyl group containing 1–12 carbon atoms, and $R_2$ and $R_3$ are hydrogen, alkyl, aryl, or alkaryl, totaling from 1 to 18 carbon atoms. $R_2$ and $R_3$ cannot both be hydrogen, however, examples of the aromatic hydroperoxides of the invention are ethylbenzene hydroperoxide
cumene hydroperoxide
diphenylmethane hydroperoxide
triphenylmethane hydroperoxide
bis (nonylphenyl) methane hydroperoxide
tris (nonylphenyl) methane hydroperoxide, etc.

The Friedels-Crafts catalysts recommended for use in the process of the invention include the following:

Fluorides, chlorides, bromides, iodides of metals such as boron, aluminum, iron, zinc, zirconium, etc. Protonic acids of the Lewis Bronsted type such as sulfuric, hydrofluoric, pyrophosphoric, etc. are also recommended.

Generally, all types of Friedel-Crafts catalysts should be effective to a greater or lesser degree. A general description of these Friedel-Crafts catalysts is presented in "Friedel-Crafts And Related Reactions" edited by George A. Olah; volumes I to IV, Interscience Publishers.

The reaction preferably proceeds at temperatures of 0° to 100° C., more preferably at from 30° to 80° C. At these temperatures the reaction will normally be in the liquid phase at atmospheric pressure, however, pressures higher than atmospheric may be employed in order to keep the reactants and reaction products in the liquid phase. The reaction may be performed in a continuous manner, as well as in a batch operation. The use of a diluent is not essential; however, a solvent may be employed, for example, to improve temperature control if desired. Suitable solvents include the following:

Aliphatic hydrocarbons of from 3 to 20 carbons atoms, aromatic hydrocarbons of from 6 to 24 carbon atoms, as well as the oxygen, chloro-, amino, nitro-, or sulfur derivatives of the aliphatic or aromatic hydrocarbons.

The lactones produced according to the process of the invention are useful in several applications. They may be further reacted with amines or anhydrous ammonia to convert them to corresponding lactams, which in turn may be polymerized to useful polymers; for example, caprolacetone may be converted to caprolactam, the starting material for the production of nylon 6.

The other primary products of the reaction of the invention will be the secondary or tertiary alcohols which may be recovered and used as such, or may be further reacted to dehydrate them to the corresponding olefins. In the case when a hydroperoxide of the empirical formula $C_nH_{2n}O_2$ is used, the primary product will be unsaturated alcohol; specifically, an allylic alcohol which can easily be dehydrated to a diolefin. If an aromatic hydroperoxide is used, the product will be an aromatic-substituted aliphatic alcohol. This alcohol can also be dehydrated to an aromatic-substituted olefin.

Selection of the particular hydroperoxide to be used can thus be dictated by the olefin desired on dehydration. Of particular interest are polymerizable olefins and diolefins such as styrene, isoprene and the like. Dehydration of alcohols can be performed in any of the known procedures, such as by heating with an appropriate catalyst.

DESCRIPTION OF THE PREFERRED EMBODIMENTS OF THE INVENTION

The following examples are provided for purposes of illustration, and are not to be construed as limiting the invention, which is defined by the appended claims. Unless otherwise indicated, all percentages are by weight.

EXAMPLES

A series of experiments was performed, with the results summarized in Table I, following. Cyclohexanone, dissolved in cyclohexane, was charged into a flask equipped with a stirrer, a heating mantle, and a thermometer. The catalyst, as specified in Table I, was then charged, and the mixture was stirred and heated to approximately 50–55° C. Tertiary-butylhydroperoxide was then added slowly, and the mixture was allowed to react for approximately one hour.

The mixture was then cooled to ambient temperature, and the products were analyzed by appropriate analytical procedures.

TABLE I.—CYCLOHEXANONE CONVERSION TO LACTONIC PRODUCTS

| Example No. | Catalyst system | Cyclohexanone, mole percent | | Tertiary-butyl-hydroperoxide, mole percent | |
|---|---|---|---|---|---|
| | | Conversion | Selectivity | Conversion | Selectivity |
| 1 | No catalyst | 2 | 0 | 9 | 71 |
| 2 | Sulfuric acid | 16 | 55 | 31 | 22 |
| 3 | Aluminum chloride | 10 | 12 | 31 | 41 |
| 4 | Sulfuric acid/aluminum chloride | 18 | 90 | 75 | 40 |

The conversion figure in each case represents the amount of that reactant which was chemically converted during the reaction (expressed in mole percent). The selectivity figure for cyclohexanone represents the mole percentage of lactonic products (as hereinbelow defined) formed. The selectivity figure for tertiary-butylhydroperoxide represents the formation of tertiary-butyl alcohol. The results summarized in Table I demonstrate that the reaction of a cyclic ketone (cyclohexanone) with tertiary-butylhydroperoxide to form lactonic products (caprolactone, epsilon-hydroxycaproic acid and polycaprolactone) is relatively slow in the absence of a catalyst (Example 1). The reaction proceeds primarily to conversion of the hydroperoxide to tertiary-butyl alcohol.

Examples Number 2 and 3 in Table I demonstrate that a Friedel-Crafts type catalyst (in this instance, sulfuric acid and aluminum chloride) unexpectedly increases the conversion of cyclohexanone as well as the selectivity to lactonic products.

In Examples 2 to 4 inclusive, in which Friedel-Crafts type catalyst were used, the conversion of tertiary-butylhydroperoxide to tertiary-butyl alcohol was also significantly increased. The indicated selectivity to tertiary-butanol is believed to be low because the alcohol in acid medium is rather easily dehydrated to isobutene. The analytical procedures employed were such that isobutene was not analyzed.

Additional experiments were conducted to illustrate the general applicability of using Friedel-Crafts type catalysts for effecting the reaction of cyclic ketones with hydroperoxides to form lactonic products.

The data derived from these experiments are summarized in Table II following.

TABLE II.—VARIATION OF FRIEDEL-CRAFTS CATALYSTS

| Example No. | Catalyst system | Cyclohexanone, mole percent | | Tertiary-butyl-hydroperoxide, mole percent | |
|---|---|---|---|---|---|
| | | Conversion | Selectivity | Conversion | Selectivity |
| 5 | No catalyst | 2 | 0 | 9 | 71 |
| 6 | $H_2SO_4/AlCl_3$ | 18 | 90 | 75 | 40 |
| 7 | Amberlite exchange resin IR-RO | 8 | 83 | 33 | 10 |
| 8 | $H_2SO_4/AlCl_3$/sec.-butanol | 30 | 96 | 100 | 17 |

Example Number 7 illustrates that a strong acid exchange resin will also increase the selectivity of cyclohexanone to lactonic products.

Example Number 8 was included to demonstrate that a polar solvent (sec.-butanol) also has a beneficial effect by increasing the rate of reaction.

EXAMPLE 9

In a manner similar to Examples 1 through 8, cyclobutanone, cyclopentanone, cycloheptanone, cyclooctanone and cyclododecanone are reacted with ethylbenzene hydroperoxide, 1-butene-3-hydroperoxide and cumene hydroperoxide, in the presence of various Friedel-Crafts catalysts to produce significant yields of the corresponding lactonic products, and the corresponding alcohols. The reactions are conducted at various temperatures between 0° and 100° C.

The reaction products are separated, and the alcohols dehydrated to the corresponding olefins by heating in the presence of alumina.

EXAMPLE 10

In a manner similar to Examples 1 through 9, cyclohexanone is reacted inturn with the hydroperoxides derived from the three isopentene isomers in the presence of various Friedel-Crafts catalysts to produce caprolactone and isomeric isopentyl alcohols. On separation of the reaction products, the alcohols are dehydrated to produce isoprene and its isomers.

EXAMPLE 11

In a similar manner as the preceding examples, cyclohexanone is reacted in turn with the hydroperoxides derived from 2-methylbutane. On separation of the reaction products the five-carbon alcohols are dehydrated to give various isoamylenes.

We claim:
1. The process of reacting a cyclic ketone with a secondary or tertiary hydrocarbon hydroperoxide of from 3 to 12 carbon atoms in the presence of a Friedel-Crafts catalyst at a temperature of from 0° C. to 100° C. to produce the corresponding cyclic lactone and the corresponding secondary or tertiary alcohol.
2. The process of claim 1, wherein the ketone is cyclohexanone, and the lactone is caprolactone.
3. The process of claim 1, wherein the hydroperoxide is tertiary-butyl hydroperoxide, and the alcohol is tertiary-butyl alcohol.
4. The process of claim 1, wherein the Friedel-Crafts catalyst is comprised of $AlCl_3$ and sulfuric acid.
5. The process of claim 1, wherein the ketone is cyclobutanone, cyclopentanone or cycloheptanone.
6. The process of claim 1, wherein the ketone is cyclooctanone or cyclodedecanone.
7. The process of claim 1, wherein the hydroperoxide is ethylbenzene hydroperoxide, 1-butene-3-hyroperoxide, cumene hydroperoxide, or an isopentene hydroperoxide.
8. The process of claim 7, and the additional steps of separating and dehydrating the secondary or tertiary alcohol to the corresponding olefin.
9. The process of claim 1, wherein the hydroperoxide is 2 - methylbutane-2-hydroperoxide or 2-methylbutane-3-hydroperoxide.
10. The process of claim 9, and the additional steps of separating and dehydrating the isoamyl alcohols formed to isoamylenes.

References Cited

UNITED STATES PATENTS

| | | | |
|---|---|---|---|
| 1,799,536 | 4/1931 | Ruzicka | 260—343 |
| 2,993,072 | 7/1961 | Chiusoli et al. | 260—632 X |
| 3,517,033 | 6/1970 | Weiberg et al. | 260—343 |
| 3,522,279 | 7/1970 | Thigpen et al. | 260—343 |

JOHN M. FORD, Primary Examiner

U.S. Cl. X.R.

260—343.5, 343.6, 343.9, 632 R, 502 R